United States Patent
Gardner et al.

(10) Patent No.: US 11,091,202 B2
(45) Date of Patent: Aug. 17, 2021

(54) CHASSIS BRACE AND SMALL OFFSET RIGID BARRIER REINFORCEMENT ASSEMBLY

(71) Applicant: FORD GLOBAL TECHNOLOGIES, LLC, Dearborn, MI (US)

(72) Inventors: Kevin Alexander Gardner, Canton, MI (US); Krishnakanth Aekbote, Novi, MI (US); Hassen Hammoud, Dearborn, MI (US); Brent Michael White, Highland, MI (US); Steve William Gallagher, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 231 days.

(21) Appl. No.: 16/405,332

(22) Filed: May 7, 2019

(65) Prior Publication Data

US 2020/0353988 A1    Nov. 12, 2020

(51) Int. Cl.
   *B62D 21/15* (2006.01)
   *B62D 27/02* (2006.01)

(52) U.S. Cl.
   CPC ......... *B62D 21/155* (2013.01); *B62D 27/02* (2013.01)

(58) Field of Classification Search
   CPC ....... B62D 21/155; B62D 27/02; B62D 25/08
   USPC ............... 296/187.1, 29, 187.09, 198, 30
   See application file for complete search history.

(56) References Cited

U.S. PATENT DOCUMENTS

| | | | |
|---|---|---|---|
| 6,286,867 B1 * | 9/2001 | Braemig | B60R 19/00 280/762 |
| 8,480,130 B2 * | 7/2013 | Dandekar | B62D 21/155 280/784 |
| 9,187,133 B2 | 11/2015 | Rangaswamaiah et al. | |
| 9,233,716 B2 | 1/2016 | Midoun et al. | |
| 9,469,347 B1 | 10/2016 | Schnug et al. | |
| 9,533,712 B2 * | 1/2017 | Panganiban | B62D 25/16 |
| 9,926,012 B2 | 3/2018 | Makowski et al. | |
| 10,189,503 B2 * | 1/2019 | Grattan | B62D 21/02 |
| 2015/0344073 A1 * | 12/2015 | Midoun | B62D 21/155 296/187.1 |
| 2017/0210424 A1 * | 7/2017 | Makowski | B60R 19/48 |

FOREIGN PATENT DOCUMENTS

WO    2018078226 A1    5/2018

OTHER PUBLICATIONS

English Machine Translation of WO2018078226A1 dated May 3, 2018.
Vellequette, L.P.; "Equipment Disparity on Ford F-150 Prompts new Crash Test"; Automotive News; https://www.autonews.com/article/20150615/OEM11/306159945/equipment-disparity-on-ford-f-150-prompts-new-crash-test; Jun. 15, 2015, pp. 1-15.

* cited by examiner

*Primary Examiner* — D Glenn Dayoan
*Assistant Examiner* — E Turner Hicks
(74) *Attorney, Agent, or Firm* — David Coppiellie; Carlson, Gaskey & Olds

(57) ABSTRACT

A chassis brace includes a body having a first end and a second end, a chassis structure abutment at the first end and a body structure abutment at the second end. Together, the chassis brace, the chassis component secured the chassis structure abutment of the chassis brace and the body component secured to the body structure abutment of the chassis brace form a small offset rigid barrier reinforcement assembly. A method of reinforcing a vehicle is also disclosed.

20 Claims, 10 Drawing Sheets

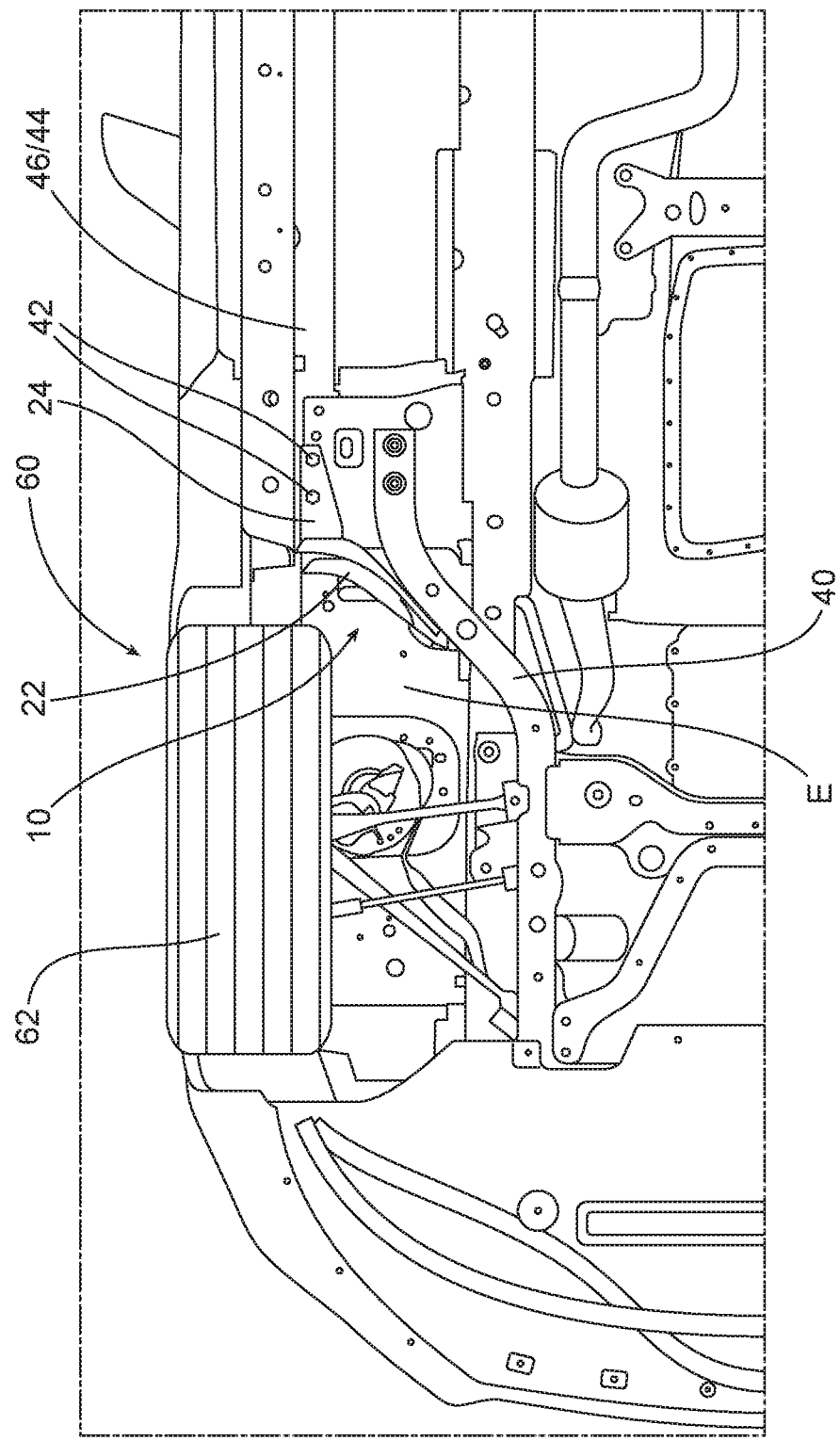

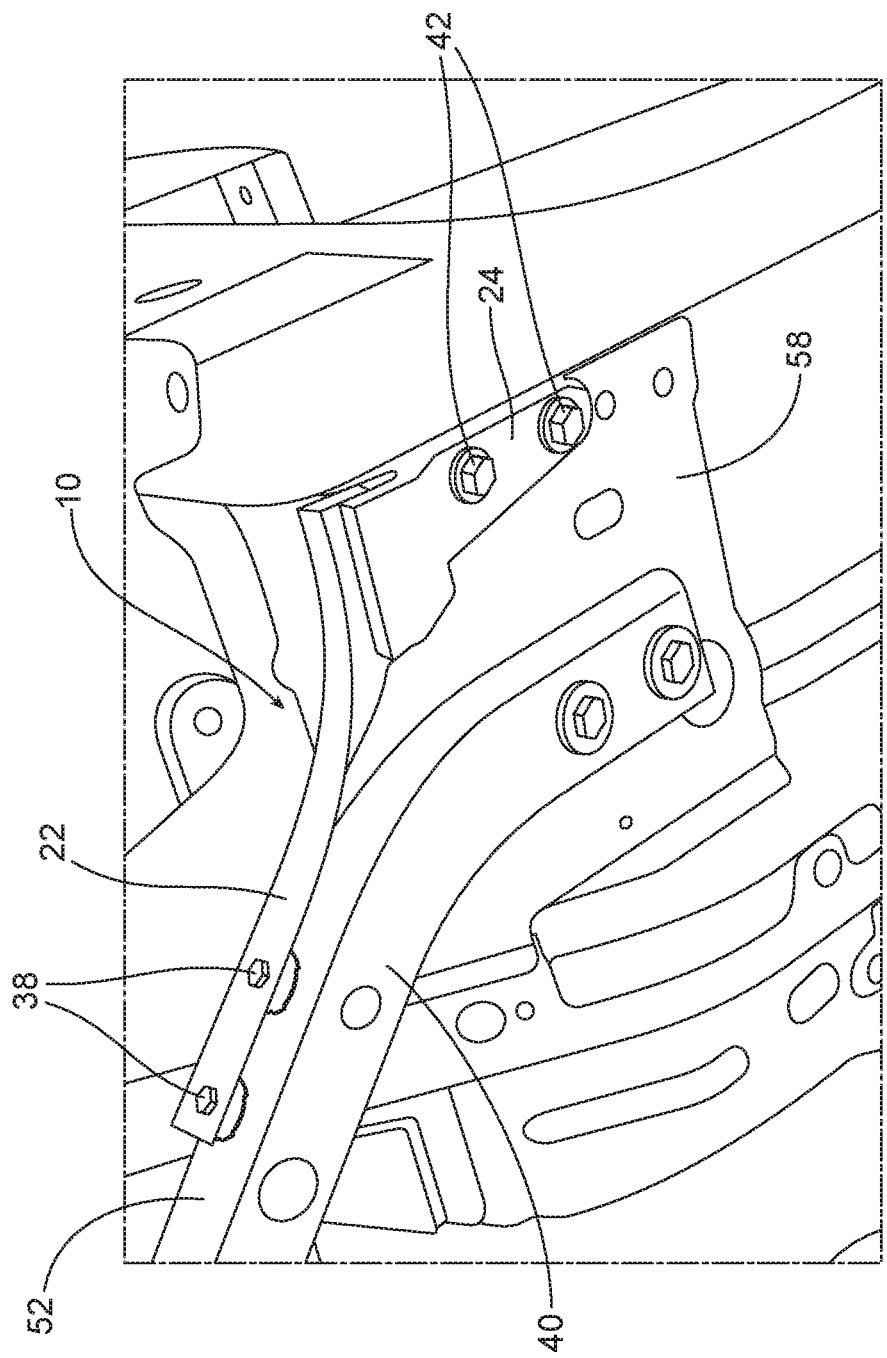

CHASSIS BRACE AND SMALL OFFSET RIGID BARRIER REINFORCEMENT ASSEMBLY

TECHNICAL FIELD

This document relates generally to the vehicle equipment field and, more particularly, to a chassis brace as well as to a small offset rigid barrier (SORB) reinforcement assembly that may be bolted in place to effectively reinforce the vehicle structure across the rear of the tire envelope.

BACKGROUND

Body-on-chassis or body-on-frame is a vehicle construction method wherein a separate body is mounted onto a relatively rigid chassis that carries the engine and the drive train of the vehicle. This method of vehicle construction has been commonly employed for years for automobiles, pickup trucks, sport utility vehicles and the like.

The Insurance Institute for Highway Safety (IIHS) performs a number of vehicle tests including the small offset rigid barrier (SORB) test. The SORB test poses unique challenges to conventional vehicle architectures. This test is performed at a test speed of 40 miles per hour with the vehicle having only a 25% overlap with the rigid barrier. See FIG. 1.

The relatively small overlap with the rigid barrier presents several difficulties because conventional front structure elements, such as the frame rails, crush cans and bumper beam are not loaded during the event. A large portion of the loading energy from the event is transferred to the vehicle structure through the wheel assembly. This is a result unique for the SORB crash configuration.

As a result of the impact, the rear portion of the wheel assembly tends to rotate inboard due to the suspension connections and load the less structurally sound dash and foot well regions of the vehicle. The kinematics and large forces associated with the wheel loading often lead to higher measured intrusions, affecting the overall vehicle performance rating for this test mode.

The chassis brace and the SORB reinforcement assembly described in this document is a countermeasure to improve SORB performance for vehicles having body-on-chassis or unibody construction. More particularly, the chassis brace reinforces the various structural elements at the rear of the tire envelope by bridging between a chassis component and a body component around the contour of the tire envelope thereby effectively reinforcing the vehicle structure throughout the rear of the tire envelope.

The chassis brace and SORB reinforcement assembly improve performance for this test mode by allowing the wheel assembly to be used as a load path. During a SORB crash event, the rear edge of the wheel assembly tends to rotate inboard due to the suspension connections and configuration of the test. There is a degree of randomness inherent to the crash event and the wheel assembly cannot interact with weaker elements of the vehicle structure, such as the foot well, dash and torque box, leading to higher intrusions. The chassis brace is able to provide improved robustness because loading from the wheel assembly is able to be withstood independent of the contact angle with the body structure, lessening the inherent randomness of the SORB crash event. The bolt-on attachment method of the chassis brace also provides robustness since bolted joints have a high degree of toughness and durability.

SUMMARY

In accordance with the purposes and benefits described herein, a new and improved chassis brace is provided. That chassis brace comprises a body having a first end and a second end, a chassis structure abutment at the first end and a body structure abutment at the second end.

The chassis brace has a first C-channel shaped member and a second C-channel shaped member joined together. The first C-channel shaped member may include the chassis structure abutment. The second C-channel shaped member may include the body structure abutment.

A first plurality of receivers may be provided at the first end. A second plurality of receivers may be provided at the second end. A first plurality of fasteners may be held in the first plurality of receivers and connect the first end to a chassis component of the vehicle upon which the chassis brace is incorporated. A second plurality of fasteners held in the second plurality of receivers may connect the second end to a body component of a vehicle to which the chassis brace is incorporated.

In one or more of the many possible embodiments of the chassis brace, the body may include an arcuate contour between the first end and the second end. That body contour may follow the contour of the tire envelope of the motor vehicle incorporating the chassis brace.

In accordance with an additional aspect, a SORB reinforcement assembly is provided. That SORB reinforcement assembly comprises a chassis component, a body component and a chassis brace having a first rigid connection to the chassis component and a second rigid connection to the body component. More particularly, the chassis brace extends along a portion of a tire envelope of a vehicle rearward of the tire envelope.

The chassis brace of the SORB reinforcement assembly includes a body having a chassis structure abutment at a first end and a body structure abutment at the second end.

The body of the chassis brace may include an arcuate contour between the chassis structure abutment at the first end and the body structure abutment at the second end. In one of the many possible embodiments of the SORB reinforcement assembly, the chassis structure abutment is C-shaped in cross section. Similarly, the body structure abutment may also be C-shaped in cross section.

A first plurality of receivers may be provided in the chassis structure abutment. A second plurality of receivers may be provided in the body structure abutment. The SORB reinforcement assembly may further include a first plurality of fasteners received in the first plurality of receivers and securing the chassis structure abutment to the chassis component. The SORB reinforcement assembly may also include a second plurality of fasteners received in the second plurality of receivers and securing the body structure abutment to the body component.

In one particularly useful embodiment of the SORB reinforcement assembly, the chassis structure abutment engages a sub-frame of the chassis. In at least one particularly useful embodiment of the SORB reinforcement assembly, the body structure abutment engages the inner rocker of the body whereby the chassis brace spans between the sub-frame and the inner rocker behind the tire envelope.

In accordance with an additional aspect, a method of reinforcing a vehicle is provided. That method also comprises the steps of: positioning a chassis brace between a chassis component and a body component of the vehicle behind a tire envelope at a front corner of the vehicle, securing a first end of the chassis brace to the chassis component and securing a second end of the chassis brace to the body component. That method also comprises the steps of: positioning a chassis brace between a chassis component and a body component of the vehicle behind a tire envelope at a front corner of the vehicle, securing a first end of the chassis brace to the chassis component and securing a second end of the chassis brace to the body component.

In the following description, there are shown and described several preferred embodiments of the chassis brace, the SORB reinforcement assembly and the related method of reinforcing a vehicle. As it should be realized, the chassis brace, the SORB reinforcement assembly and the method are capable of other, different embodiments and its several details are capable of modification in various, obvious aspects all without departing from the chassis brace, SORB reinforcement assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the chassis brace, the SORB reinforcement assembly and the method of reinforcing a vehicle and together with the description serve to explain certain principles thereof.

FIG. 6 is a detailed bottom plan view of a motor vehicle equipped with the chassis brace of FIG. 1 which spans between a chassis component (the sub-frame) and a body component (the inner rocker) and has a body contour that follows the contour of the tire envelope at the rear of the front tire envelope.

FIG. 7 is a detailed perspective view showing the connection of the chassis brace at one end to a chassis component (sub-frame) and at the opposite end to a body component (inner rocker).

Reference will now be made in detail to the present preferred embodiments of the chassis brace, SORB reinforcement assembly and method of reinforcing a vehicle, examples of which are illustrated in the accompanying drawing figures.

DETAILED DESCRIPTION

Figure 1:
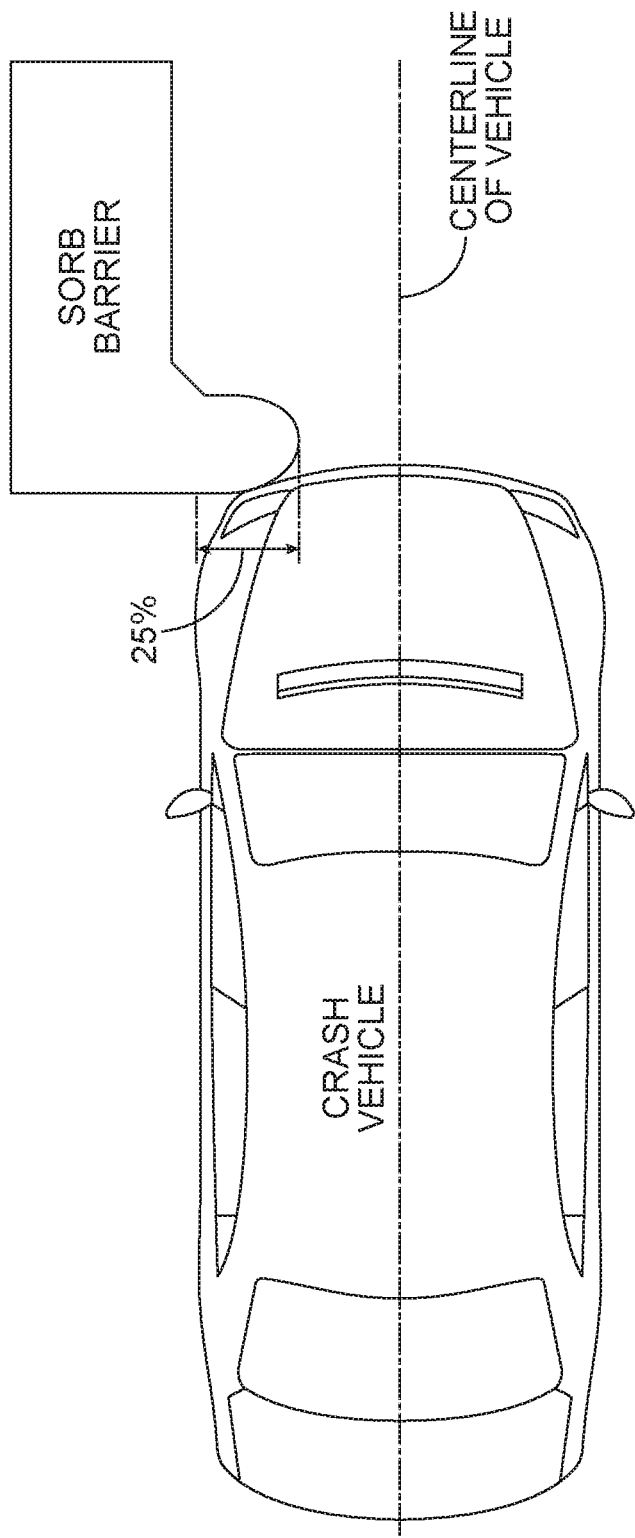
FIG. 1 is a top plan illustration of the small offset rigid barrier (SORB) test.
Figure 2:
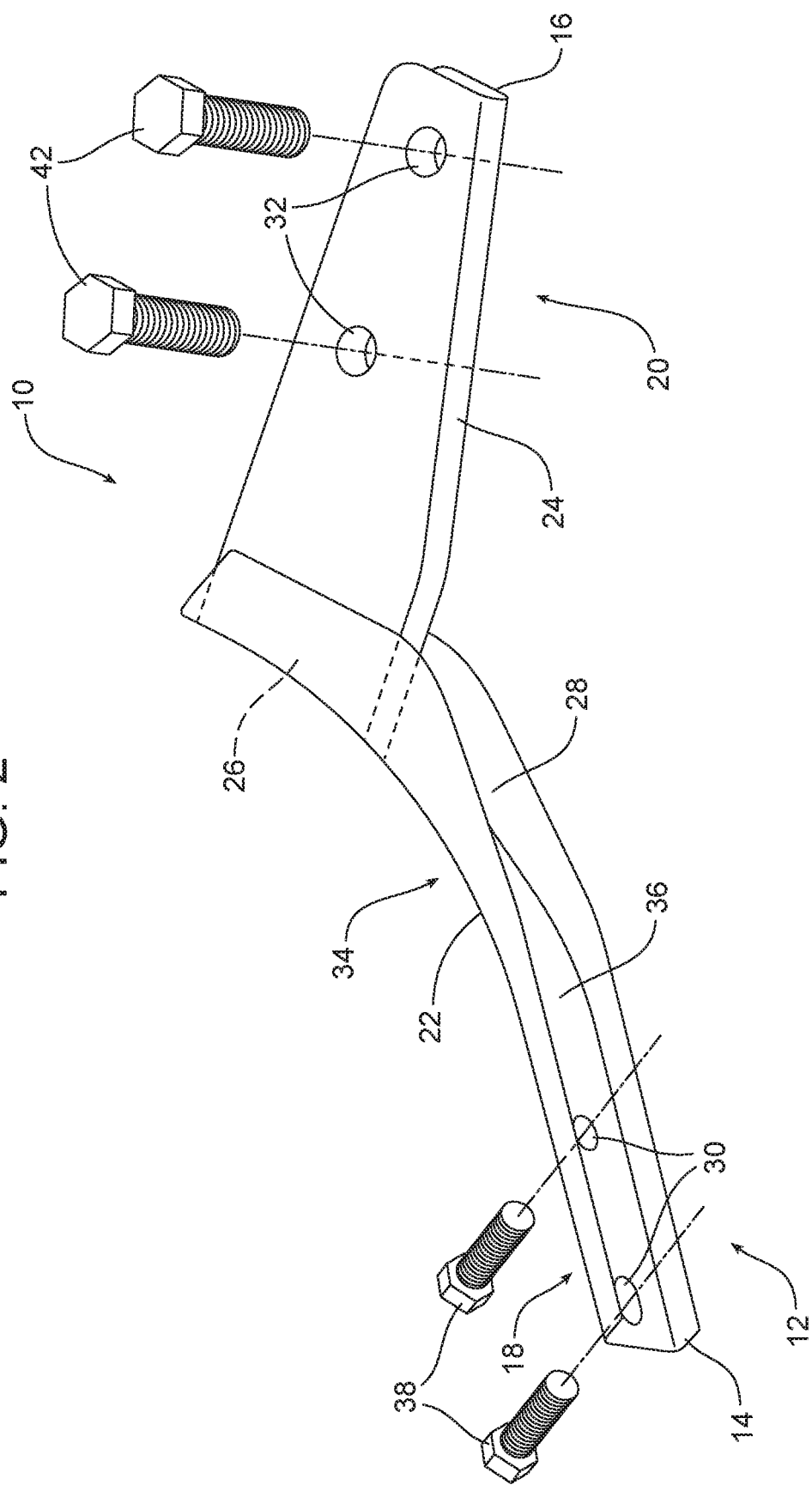
FIG. 2 is a perspective view of the chassis brace including a chassis structure abutment at a first end and a body structure abutment at a second end.

Reference is now made to FIG. 2 which illustrates the chassis brace 10. The chassis brace 10 includes a body 12 having a first end 14 and a second end 16. A chassis structure abutment, generally designated by reference numeral 18, is provided at the first end 14. A body structure abutment, generally designated by reference numeral 20, is provided at the second end 16.

More particularly describing the chassis brace 10, the body 12 includes a first C-channel shaped member 22 and a second C-channel shaped member 24 that are joined together. More particularly, the proximal end 26 of the second C-channel shaped member 24 is received and held in the channel 28 of the first C-channel shaped member 22 at an end of the first C-channel shaped member opposite the first end 14 of the chassis brace 10.

The first C-channel shaped member 22 and the second C-channel shaped member 24 may be joined together by any appropriate means. In the illustrated embodiment, the first C-channel shaped member 22 and the second C-channel shaped member 24 are welded together with the proximal end 26 of the second C-channel shaped member 24 received and held in the channel 28 of the first C-channel shaped member 22. The two C-shaped members 22 and 24 generally open away from each other. As should be further appreciated, the first C-channel shaped member 22 includes the chassis structure abutment 18. The second C-channel shaped member 24 includes the body structure abutment 20.

As further illustrated in FIG. 2, a first plurality of receivers 30 are provided at the first end 14 and a second plurality of receivers 32 are provided at the second end 16. As further illustrated in FIG. 2, the body 12 includes an arcuate contour, generally designated by reference numeral 34 between the first end 14 and the second end 16. More particularly, the arcuate contour 34 is provided in the wall 36 forming the bottom of the channel 28 in the first C-channel shaped member 22.

A first plurality of fasteners 38 are received and held in the first plurality of receivers 30 and function to connect the first end 14 of the chassis brace 10 to a chassis component, such as the sub-frame 40. See also FIGS. 3-5. A second plurality of fasteners 42 are received and held in the second plurality of receivers 32 and function to connect the second end 16 of the chassis brace 10 to a body component such as the rocker inner 46.

Figure 3:
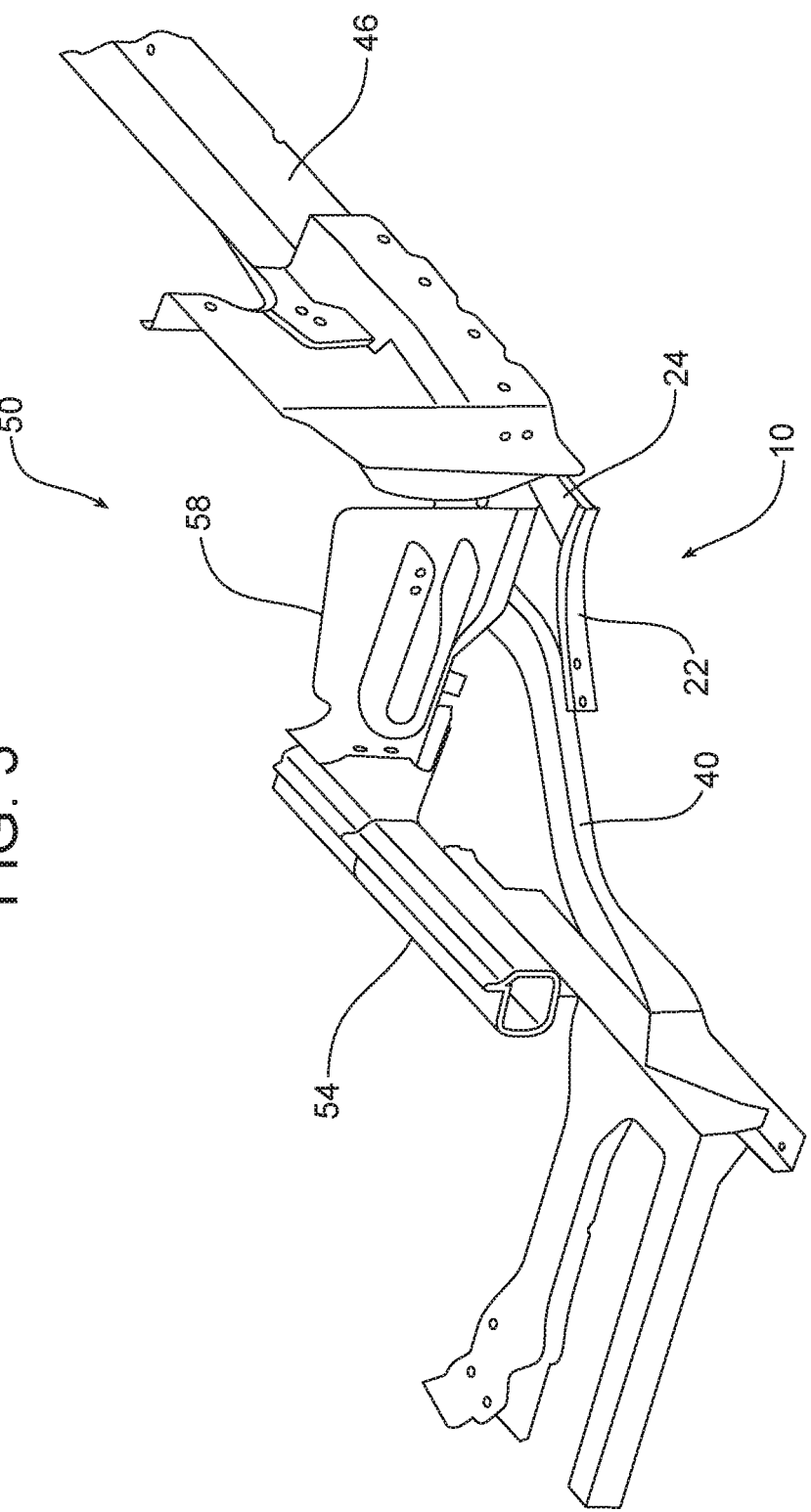
FIG. 3 is an exploded perspective view illustrating the chassis brace, the sub-frame and rail of the chassis and the torque box and rocker of the body.
Figure 4:
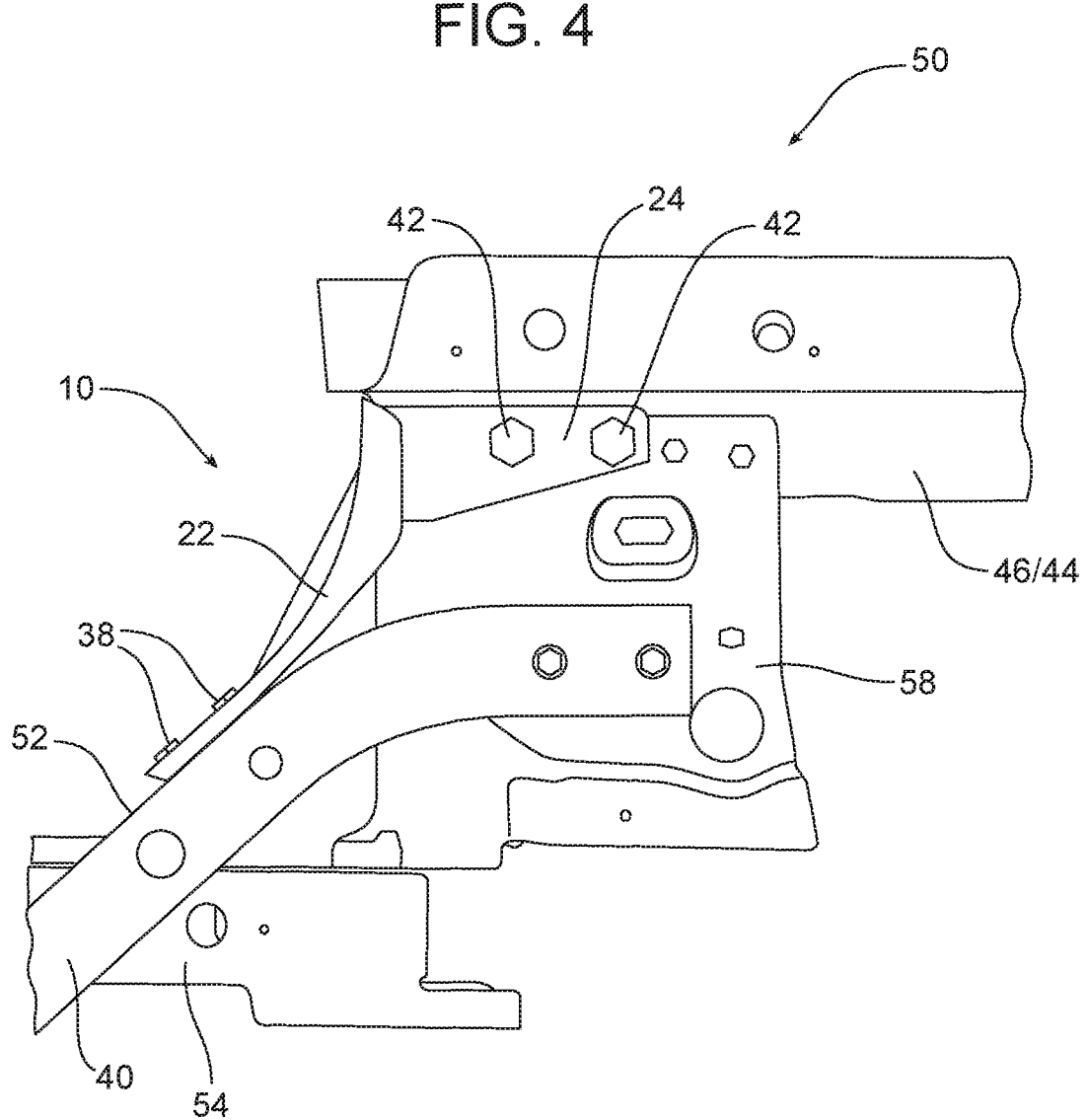
FIG. 4 is a detailed bottom plan view of the assembled SORB reinforcement assembly.
Figure 5:
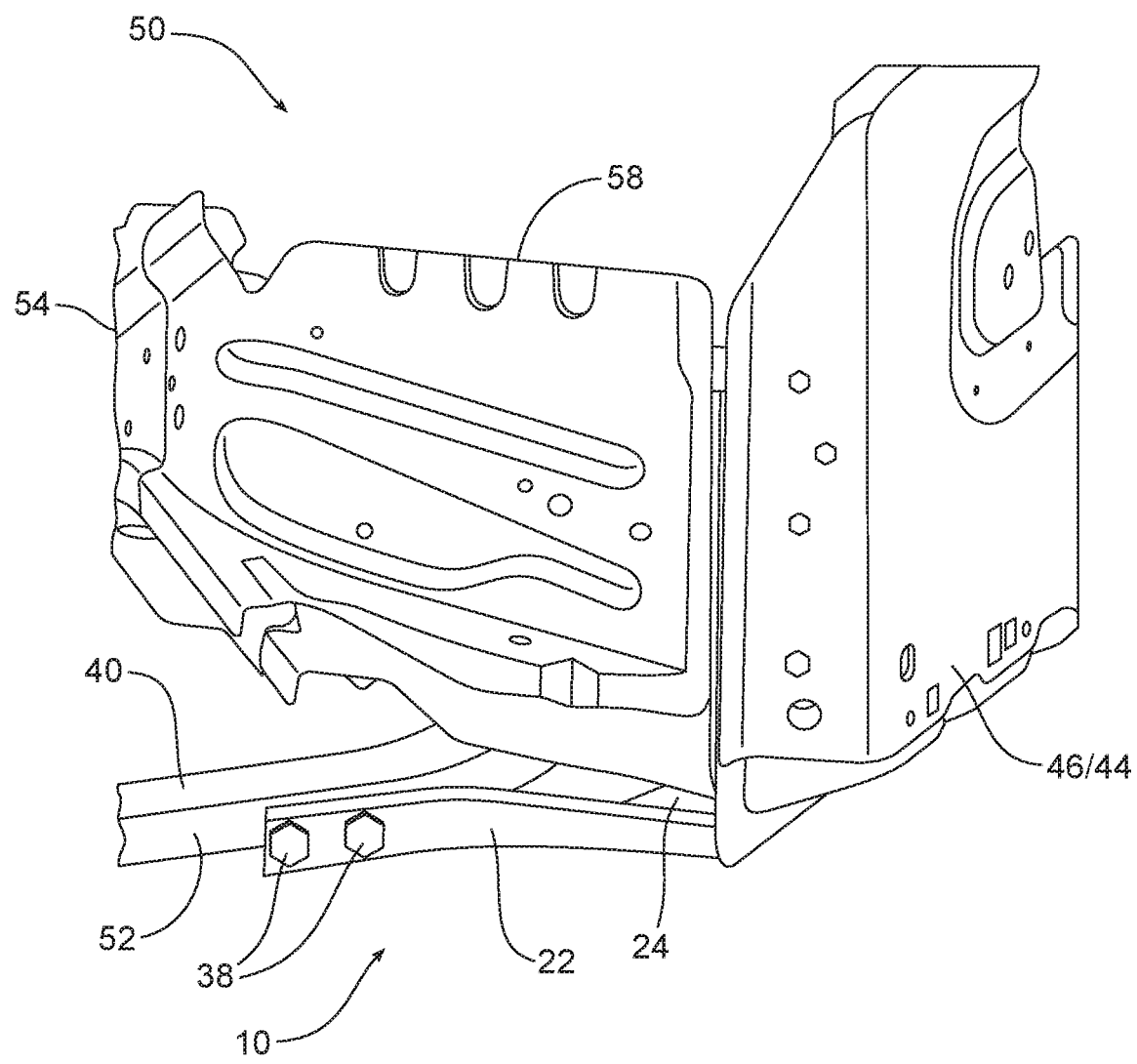
FIG. 5 is a detailed perspective view of the assembled SORB reinforcement assembly illustrated in FIG. 4.

The various components of the SORB reinforcement assembly 50 are illustrated in an exploded perspective view in FIG. 3 and in detail in an assembled state in FIGS. 4 and 5. FIG. 3 illustrates the rail 54 and sub-frame 40 of the vehicle chassis, the inner rocker 46 and torque box 58 of the vehicle body and the chassis brace 10.

As illustrated in FIGS. 4 and 5, the torque box 58 bridges between and connects the inner rocker 46 of the body to the rail 54 of the chassis. The SORB reinforcement assembly 50 further reinforces this area of the vehicle immediately behind the tire envelope E at a front corner of the vehicle.

More particularly, the SORB reinforcement assembly 50 includes the chassis component (in the illustrated embodiment, the sub-frame 40), the body component (in the illustrated embodiment, the inner rocker 46) and the chassis brace 10 which has a first rigid connection to the chassis component/sub-frame and a second rigid connection to the body component/inner rocker. More particularly, as best illustrated in FIGS. 4, 5 and 7, the fasteners 38 secure the first end 14 of the chassis brace 10 to a sidewall 52 of the chassis component: in this case the sub-frame 40. The second plurality of fasteners 42 secure the second end 16 of the chassis brace 10 to the body component 44: in this case the inner rocker 46.

As best illustrated in FIG. 6, the chassis brace 10 functions to reinforce the rear for the tire envelope E at a front corner of the vehicle. As a result, the chassis brace 10 and the SORB reinforcement assembly 50 alter the overall kinematics of a SORB crash event. More particularly, the entire wheel assembly 60, including the tire 62, is utilized as a load path so that the crash vehicle is able to generate additional lateral motion which is a favorable outcome. More particularly, the chassis brace 10 and the SORB reinforcement assembly 50 reinforce the rear of the tire envelope E so that the wheel assembly 60 is pushed outboard during the crash event thereby preventing excessive intrusions into the foot well and dash regions of the vehicle.

Figure 8A:
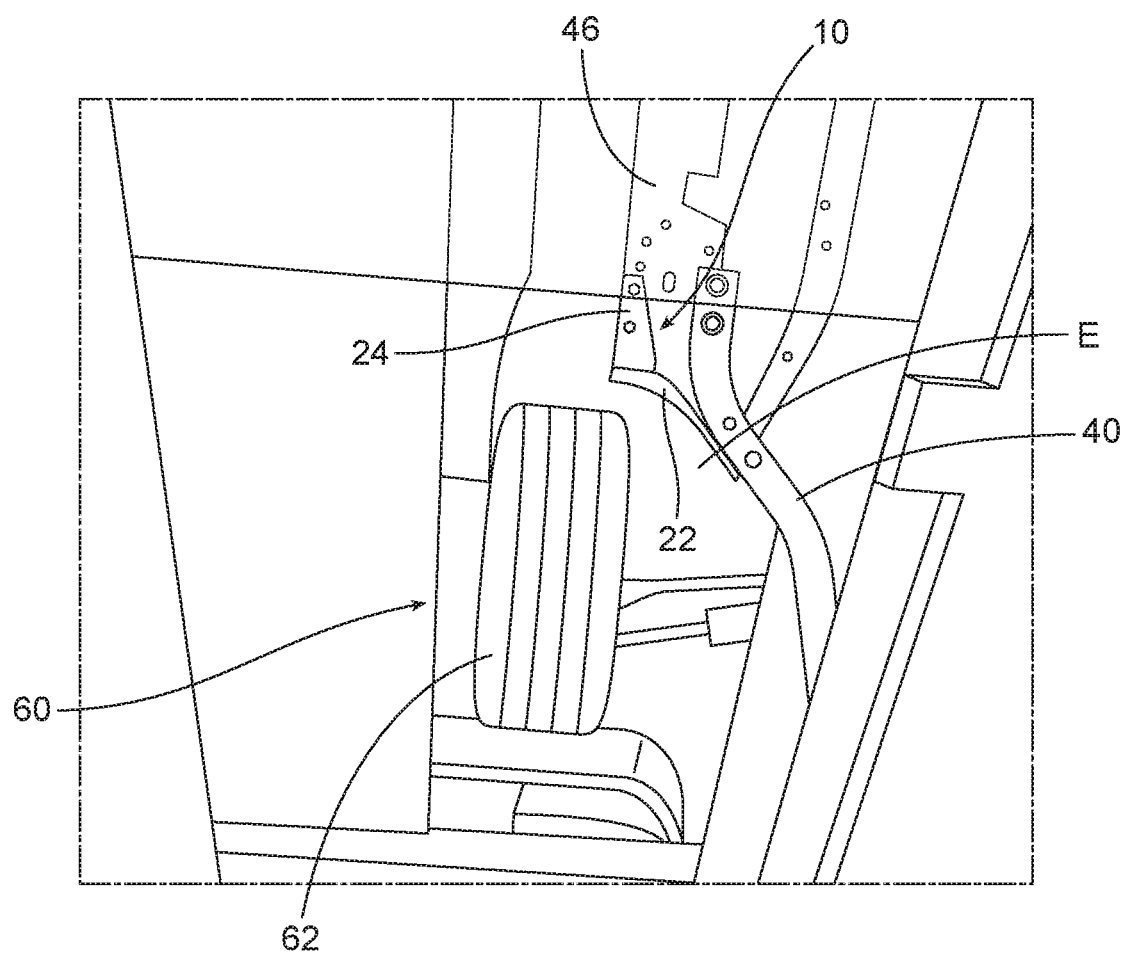
FIGS. 8A-8C are a series of views illustrating how the chassis brace and SORB reinforcement assembly function to push the wheel assembly outboard during a SORB crash event thereby effectively preventing extensive intrusions into the foot well and dash regions of the vehicle.
Figure 8B:
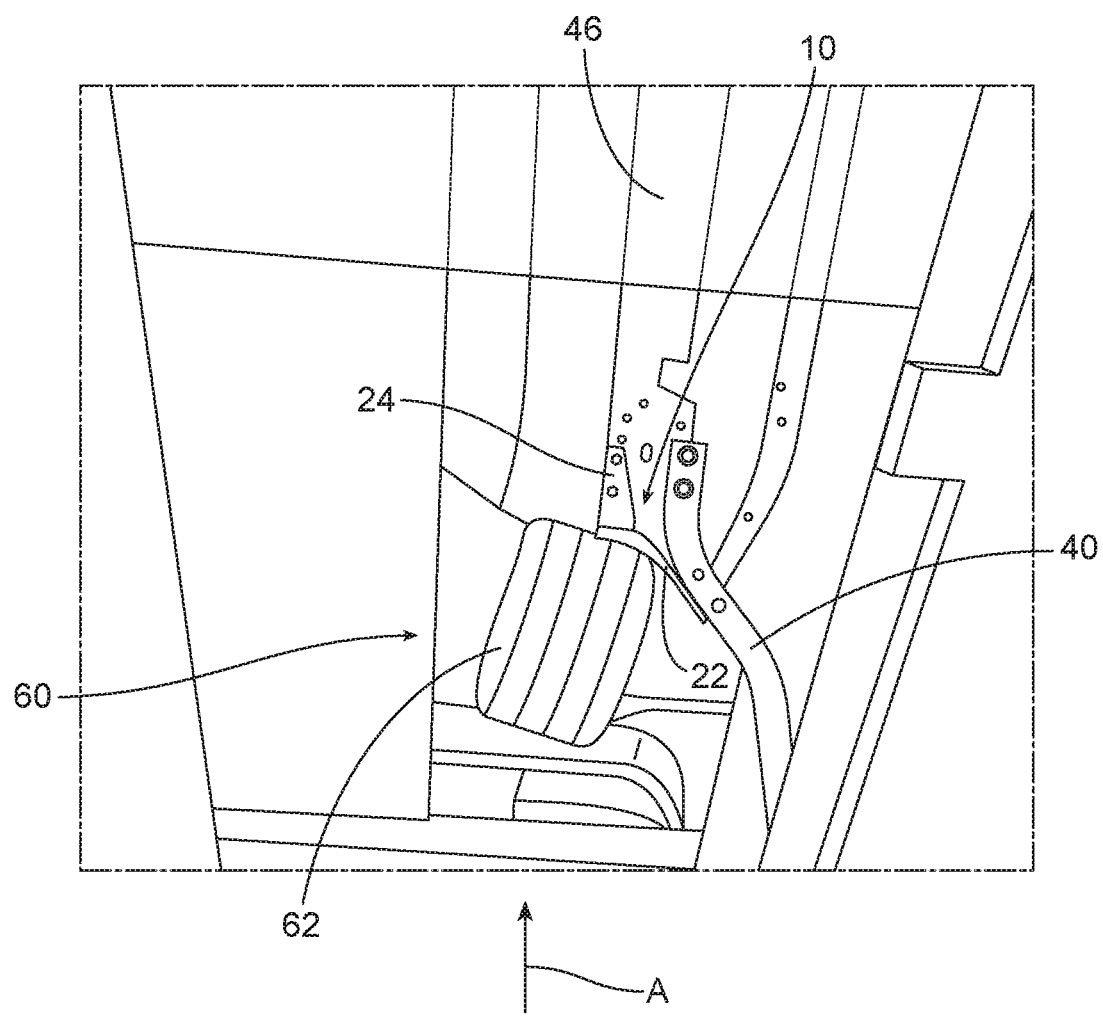
Figure 8C:
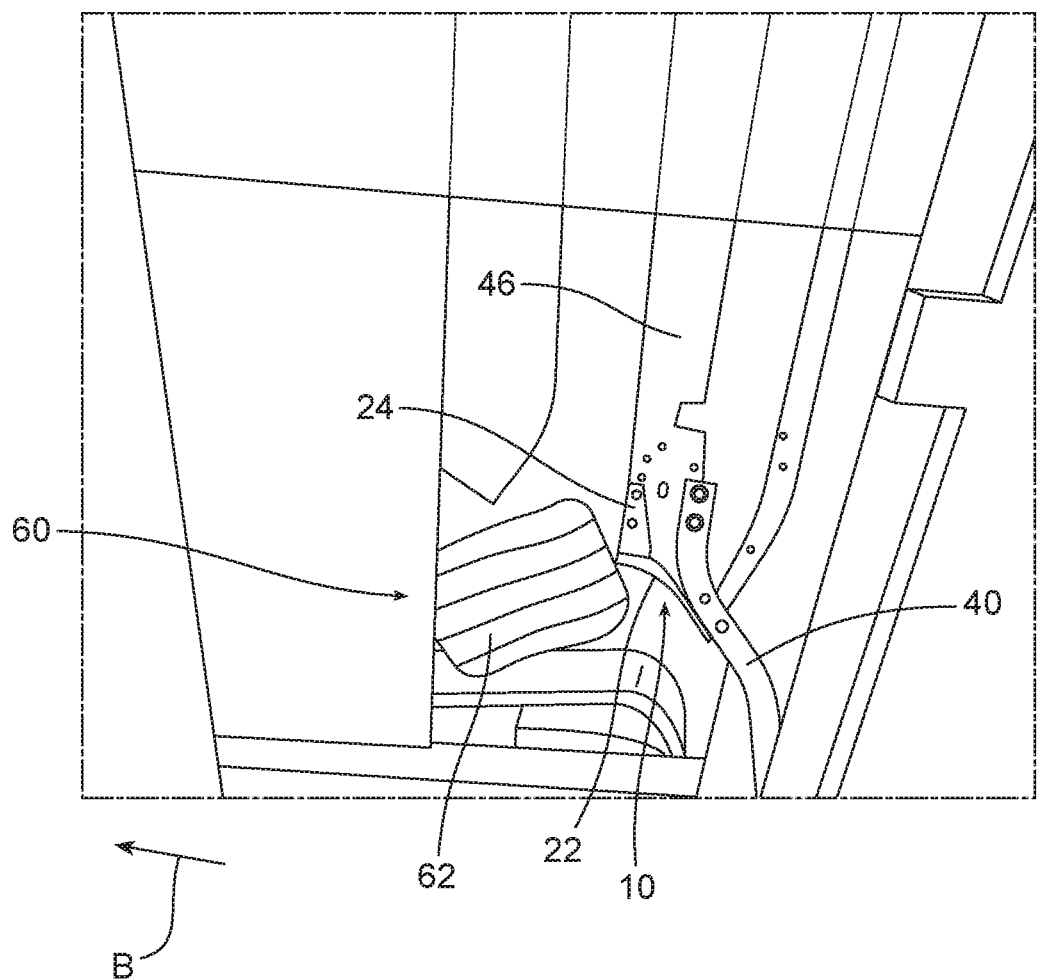

This advantageous outcome is illustrated in FIGS. 8A-8C. FIG. 8A illustrates the wheel assembly 60 including the tire 62 in the tire envelope E immediately prior to impact. FIG. 8B illustrates how the wheel assembly 60 and, more particularly, the tire 62 is driven rearward in the direction of action arrow A upon impact until the wheel comes into engagement with the chassis brace 10 spanning between the chassis component/sub-frame 40 and the body component/inner rocker 46. FIG. 8C illustrates how the chassis brace 10 and the SORB reinforcement assembly 50 function to generate lateral motion by pushing the wheel assembly 60 and tire 62 outboard in the direction of action arrow B away from the foot well and dash regions of the vehicle.

Consistent with the above description, a method of reinforcing a vehicle includes the steps of: (a) positioning a chassis brace 10 between a chassis component, such as the sub-frame 40, and a body component, such as the inner rocker 46, behind the tire envelope E at the front corner of the vehicle, (b) securing a first end 14 of the chassis brace to the chassis component and (c) securing a second end 16 of the chassis brace to the body component.

The foregoing has been presented for purposes of illustration and description. It is not intended to be exhaustive or to limit the embodiments to the precise form disclosed. Obvious modifications and variations are possible in light of the above teachings. For example, the body 12 of the illustrated chassis brace 10 includes a first C-channel shaped member 22 and a second C-channel shaped member 24 that are joined together. It should be appreciated that the members 22, 24 do not have to be C-channel shaped but may assume any other appropriate shape to achieve the same goal including, but not necessarily limited to, square, rectangular, polygonal, tubular or the like. All such modifications and variations are within the scope of the appended claims when interpreted in accordance with the breadth to which they are fairly, legally and equitably entitled.

What is claimed:

1. A chassis brace, comprising:
a body having a first end and a second end;
a chassis structure abutment at said first end; and
a body structure abutment at said second end,
wherein said body includes a first C-channel shaped member and a second C-channel shaped member,
wherein said second C-channel shaped member is received and secured in a channel of said first C-channel shaped member.

2. The chassis brace set forth in claim 1, further including a first plurality of receivers at said first end and a second plurality of receivers at said second end.

3. The chassis brace set forth in claim 2, further including a first plurality of fasteners held in said first plurality of receivers and connecting said first end to a chassis component.

4. The chassis brace set forth in claim 3, further including a second plurality of fasteners held in said second plurality of receivers and connecting said second end to a body component.

5. The chassis brace set forth in claim 4, wherein said body includes an arcuate contour between said first end and said second end.

6. The chassis brace set forth in claim 1, wherein said first C-channel shaped member includes said chassis structure abutment and said second C-channel shaped member includes said body structure abutment.

7. A small offset rigid barrier (SORB) reinforcement assembly, comprising:
a chassis component;
a body component; and
a chassis brace having a first rigid connection to said chassis component and a second rigid connection to said body component,
wherein said chassis component is a sub-frame of said chassis and said body component is an inner rocker of said body.

8. The SORB reinforcement assembly of claim 7 wherein said chassis brace extends along a portion of a tire envelope of a vehicle rearward of said tire envelope.

9. The SORB reinforcement assembly of claim 8, wherein said chassis brace includes a body having a chassis structure abutment at a first end and a body structure abutment at a second end.

10. The SORB reinforcement assembly of claim 9, wherein said body includes an arcuate contour between said chassis structure abutment at said first end and said body structure abutment at said second end.

11. The SORB reinforcement assembly of claim 10, including a first plurality of receivers in said chassis structure abutment.

12. The SORB reinforcement assembly of claim 11, including a second plurality of receivers in said body structure abutment.

13. The SORB reinforcement assembly of claim 12, further including a first plurality of fasteners received in said first plurality of receivers and securing said chassis structure abutment to said chassis component.

14. The SORB reinforcement assembly of claim 13, further including a second plurality of fasteners received in said second plurality of receivers and securing said body structure abutment to said body component.

15. The SORB reinforcement assembly of claim 14, wherein said chassis structure abutment engages said sub-frame of said chassis, and further wherein said body structure abutment engages said inner rocker of said body whereby said chassis brace spans between said sub-frame and said inner rocker behind said tire envelope.

16. The SORB reinforcement assembly of claim 10, wherein said chassis structure abutment is C-shaped in cross section, and further wherein said body structure abutment is C-shaped in cross section.

17. A method of reinforcing a vehicle, comprising:
positioning a chassis brace between a chassis component and a body component of the vehicle behind a tire envelope at a front corner of the vehicle;
securing a first end of the chassis brace to the chassis component; and
securing a second end of the chassis brace to the body component,
wherein the chassis brace is configured to push a wheel assembly of the vehicle in a laterally outboard direction relative to the tire envelope during an impact.

18. The method of claim 17, comprising:
securing a torque box to the body component and to the chassis component,
wherein the chassis component is a sub-frame and the body component is an inner rocker.

19. The SORB reinforcement assembly of claim 7, comprising a torque box that bridges between and connects said inner rocker to a rail of said chassis, wherein said rail of said chassis is secured directly to said sub-frame.

20. The SORB reinforcement assembly of claim 7, wherein a body of said chassis brace includes a first channel shaped member and a second channel shaped member, and further wherein said second channel shaped member is received and secured in a channel of said first channel shaped member.

* * * * *